July 30, 1968 R. J. CLARK ET AL 3,395,257

TELEPHONE SET STAND AND INTEGRAL DIRECTORY INDEX MECHANISM

Filed Sept. 22, 1965 4 Sheets-Sheet 1

INVENTORS R. J. CLARK, JR.
T. B. PRINCE
BY E. J. Olinder
ATTORNEY

United States Patent Office 3,395,257
Patented July 30, 1968

3,395,257
TELEPHONE SET STAND AND INTEGRAL DIRECTORY INDEX MECHANISM

Robert J. Clark and Terry B. Prince, Indianapolis, Ind., assignors to Bell Telephone Laboratories, Incorporated, New York, N.Y., a corporation of New York Filed Sept. 22, 1965, Ser. No. 489,322
10 Claims. (Cl. 179—100)

This invention relates to telephone index mechanisms and more particularly to mechanisms of this type that are an integral part of a telephone set.

From the point of view of a telephone subscriber, the most troublesome aspect of telephone dialing lies in the acquisition of the directory number of the party to be called. In general, the number must either be recalled from memory, obtained from an information operator or located in a directory. Each of these methods lacks either efficiency, speed or convenience. Repertory dialer telephone sets, wherein directory numbers are stored magnetically or by means of punched cards, offer one solution to the problem, but such apparatus is, as yet, both elaborate and costly insofar as the needs of the average subscriber are concerned.

A variety of attempts have been made in the prior art to provide a scroll type or memo pad type of directory as an appendage to a telephone set. Each of these attempts has resulted in apparatus that is somewhat awkward to use, in one way or another, and subscriber acceptance has been very limited. The gadget-like character of such apparatus has proved unattractive to the average telephone subscriber, owing to the deficiencies noted and also because of the further deficiency that such appendage-like directory devices are structurally incompatible with the compact, streamlined package that houses the modern telephone set.

Accordingly, a general object of the invention is to improve telephone directory devices.

A specific object of the invention is to enhance the accessibility and convenience of a telephone directory device without detracting from the styling and compactness of the associated telephone set.

Another object is to improve the mounting means for telephone directory devices.

These and other objects are achieved in a specific embodiment of the invention by a telephone set stand that includes directory means as an integral and unobtrusive part thereof. In accordance with the principles of the invention, the dial assembly is positioned to provide space for an adjacent tub-like housing in the flat or face portion of an otherwise conventional set. A directory assembly is mounted in the housing indicated, being secured by a spring clip arrangement to facilitate ready removal. The assembly includes a pair of gear driven rollers for positioning the recording tape and a roller frame or table assembly. A table member is mounted within the frame between the rollers to provide a supporting surface for the tape and also to provide a writing surface to permit directory indicia to be imprinted on the tape without removing the cartridge assembly from its mounting. The entire assembly is positioned below the level of the face of the telephone set base, the only portion exposed to view through the aperture being the table supported portion of the recording tape that displays one of the preselected imprinted directory indicia and immediately adjacent indicia.

Another aspect of the invention pertains to the tape positioning means. A thumb wheel and pinion gear arrangement is mounted in another accommodating aperture in the face of the telephone base so that only a small segment of the wheel protrudes above the level of the base. A connecting gear train between the pinion gear and the roller driving gears is entirely hidden from view below the level of the base. The gear train includes a unique clutch arrangement that permits only a single one of the roller gears to be directly driven by the gear train at any one time. As a consequence, the nondriven roller, which is the roller from which tape is being removed, is permitted to rotate at an independent and variable speed determined by the amount of tape stored thereon. In selecting the driven roller, the clutch mechanism is responsive to the direction of rotation of the thumb wheel and integral pinion gear.

Accordingly, one feature of the invention pertains to the complete structural integration of a telephone directory assembly in the base of an otherwise conventional telephone set.

Another feature relates to a cartridge-like tape assembly that is removably positioned in an accommodating aperture in the top of the base of a telephone set so that a selected portion of the tape may be positioned flush with the aperture and so that the remainder of the assembly is hidden from view below the base cover member.

A further feature concerns a directory tape positioning mechanism that includes a single manually actuated thumb wheel mounted in an aperture in the face of the telephone set base so that only a small segment of the wheel protrudes above the level of the base.

An additional feature involves a clutch mechanism in a directory arrangement that is integrally mounted in the base structure of a telephone set. The recording tape of the directory is mounted on a pair of roller members to facilitate positioning through a rotatable thumb wheel. The unique clutch mechanism ensures driving gear engagement with only a single one of the rollers, the driven roller being determined by the direction of rotation of the thumb wheel.

The principles of the invention, as well as additional objects and features thereof, will be fully apprehended from the following detailed description of an illustrative embodiment and from the appended drawing in which.

Figure 1:
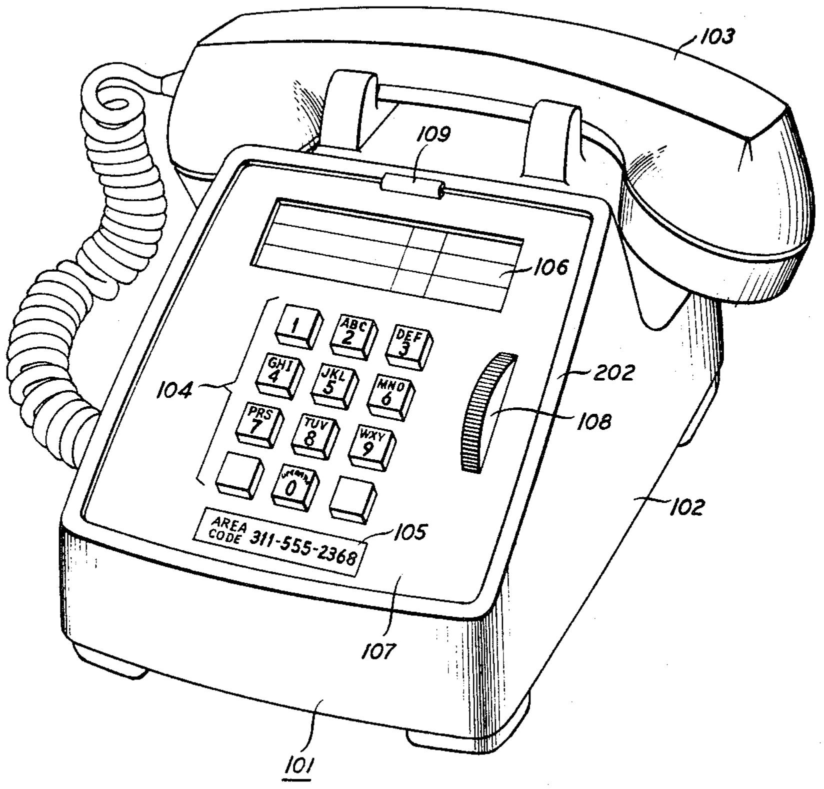
FIG. 1 is a perspective view of a desk telephone set embodying a directory in accordance with the invention.

The conventional portion of the desk telephone set 101 of FIG. 1 includes a housing 102, a handset assembly 103 and a pushbutton dial assembly 104. The external appearance of the set has been modified, in accordance with the invention, by the installation of a removable face plate member 107, which is substantially flush with the flange 202 of housing 102. Face plate 107 can be removed by pulling on a release tab 109. The conventional position of dial assembly 104 has been shifted toward the front of the set to provide a space for a directory window 106. The set directory number display 105 is still positioned immediately in front of dial assembly 104. In accordance with the invention, a thumb wheel 108 is provided to position the desired directory information for display in the center of window 106.

Figure 2:
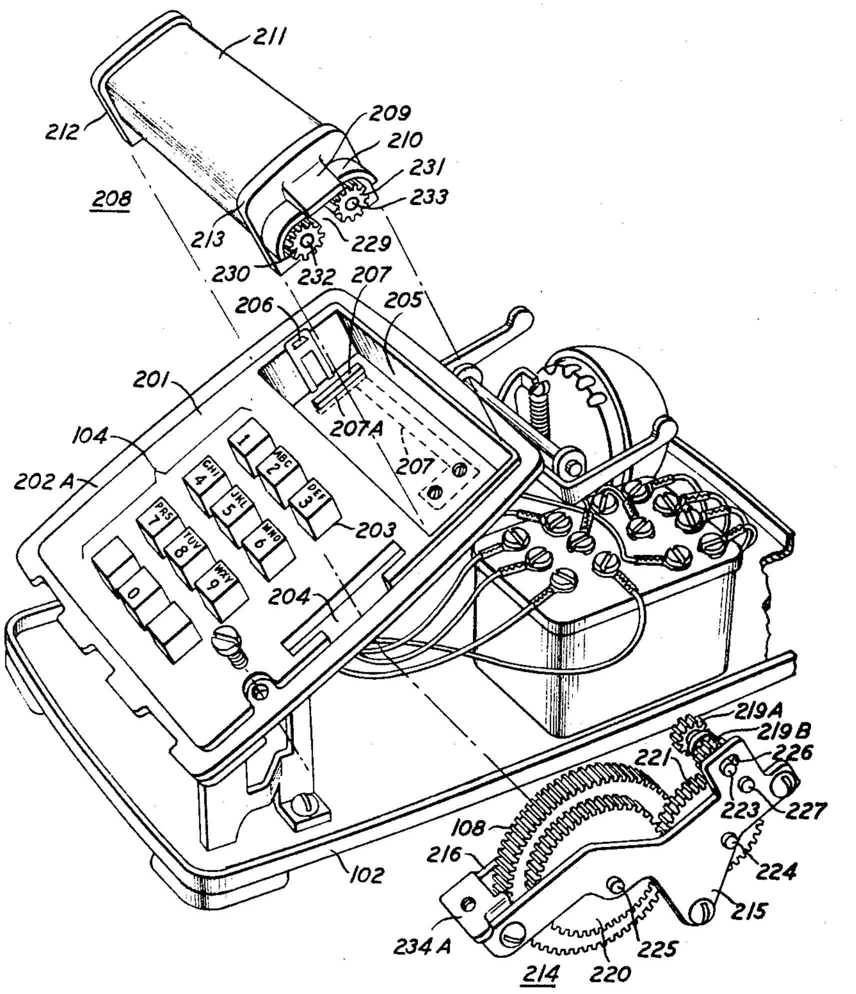
FIG. 2 is a partially exploded view of the telephone set shown in FIG. 1 with the face plate removed.
Figure 4:
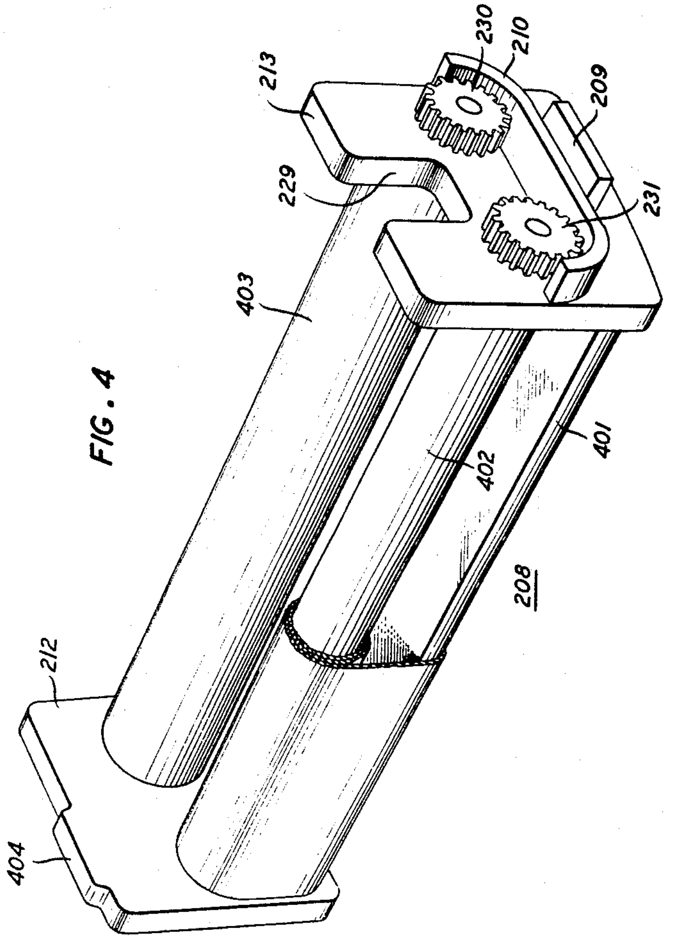
FIG. 4 is a perspective view of the table assembly shown in FIG. 2.
Figure 3:
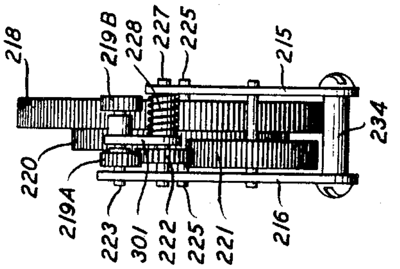
FIG. 3 is an end view of the gear train assembly shown in FIG. 2.

In FIG. 2 face plate 107 of the set shown in FIG. 1 has been removed and certain of the elements of the directory unit are shown in an exploded view in order to facilitate the disclosure of certain of the key structural features. The directory unit consists of a deck member 201, a table assembly 208 and a gear train assembly 214. Deck 201 is shaped to fit the outline of the inside of the telephone housing flange 202, the top surface thereof being slightly below the level of the flange. Deck 201 includes a step-down flange 202A which fits under the housing flange 202, shown in FIG. 1. A total of 12 openings 203 are provided in the upper center of deck 201 to accommodate the 12 protruding pushbuttons of dial assembly 104. An additional opening 204 in deck 201 accommodates thumb wheel 108 of the gear train assembly 214.

A substantially rectangular pocket 205 is formed in the upper portion of deck 201 to provide a mounting space for table assembly 208. The primary function of deck 201 is to seal off the components of the telephone set from the operator when the face plate 107 has been removed to permit access to the directory unit. On the left side of pocket 205 is a locking arm 206. Deck assembly 208 is removed from pocket 205 by pressing outwardly on locking arm 206, releasing the left side of table assembly 208 which is then tilted upwardly and out of pocket 205 through the action of an ejection spring 207. Spring 207, a cantilever beam type with a load at its free end, is mounted on the underside of the bottom of pocket 205, and extends upwardly into the pocket through a hole 207A. The action of spring 207 in ejecting the left end of table assembly 208 from pocket 205 permits the operator to grasp the table assembly and remove it from the set.

The details of table assembly 208 are shown in FIGS. 2, 4, 6, 7 and 8. Table assembly 208 includes a molded table 401 and a pair of legs 212 and 213. Legs 212 and 213 and table 401 may advantageously be molded in a single integral structure or, alternatively, the legs may be affixed to the top portion of the table with suitable fasteners. Tab 605, FIG. 6, on leg 212 mates with locking arm 206, and a tab 209 on the upper right side of leg 213 mates with a slot, not shown, provided in deck 201. The two tabs 605 and 209 in conjunction with their mates (not shown) on deck 201 provide the means for locking table assembly 208 to deck 201.

Figure 8:
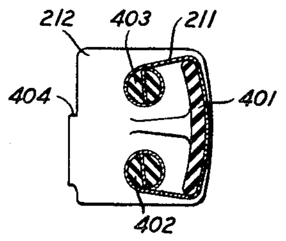
FIG. 8 is a cross-section view of the table assembly shown in FIG. 7 taken along the line 8—8 indicated by the small arrows.

A pair of rollers 402 and 403 are mounted between table legs 212 and 213. As shown in FIG. 8, a slot in each of the rollers 402 and 403 provides a means for securing the respective ends of a directory display tape 211. A hole 603, shown in FIG. 6, in the right end of each of the rollers 402 and 403 provides a means for mounting shafts 232 and 233 and roller driving gears 230 and 231. A hole 601 in the left end of each of the rollers 402 and 403 accommodates a brake spring 602. Spring 602, one of which is mounted in each of the rollers, provides the amount of force needed to prevent tape 211 from unwinding freely from the rollers. Each of the springs 602 is trapped between a respective one of the rollers 402 and 403 and the left leg 212 of table assembly 208, thus forcing the right end of each roller against the right leg of the table.

Table 401 performs a dual function in that it serves as a writing surface when recording directory information on tape 211 and also serves as a bearing surface for the tape during tape travel. Table 401 may advantageously be molded from a plastic material such as Celcon, for example, or any similar material with a smooth hard surface that is characterized by low sliding friction.

Rollers 402 and 403 which are rotatable cylindrical members, utilized, as shown, for storing and positioning recording tape 211, may be fabricated from the same material as table 401. Gears 230 and 231 of table assembly 208 are provided with a cover 210 to protect them from damage when the table assembly is withdrawn from its tub-like housing or pocket 205.

Gear train assembly 214 links thumb wheel 108 to a selected one of the tape roller drive wheels 230 and 231. Gear train assembly 214 includes a pair of side plates 215 and 216 separated and positioned by the spacers 234 and 234A and by a third spacer, not shown. Thumb wheel 108 is integrally combined with a gear wheel 220. This arrangement is employed inasmuch as thumb wheel 108 is exposed and subject to tooth damage whereas integral gear 220 is in a protected position. Thumb wheel 108 and integral gear 220 are mounted on a shaft 225. The remainder of the gear train includes gear 221, mounted on shaft 224; gear 222, mounted on shaft 227; and gears 219A and 219B mounted on shaft 23. An idler arm 301 is mounted for pivotal movement on shaft 227. As idler arm 301 is pivoted on shaft 227 it carries shaft 223 and gears 219A and 219B mounted thereon through an arc of travel defined by the limits of slot 226 in the upper right tab portion of side plate 215, shown in FIG. 2. A clutch spring 228 is coiled about a mounting sleeve that is integral with shaft 227. Spring 228 applies sufficient force against idler arm 301 to ensure proper clutch action. Idler arm 301 is mounted for free rotation about shaft 227, but the force of spring 228 is sufficient to ensure that idler arm 301 is carried through its arc of travel in either one direction or the other depending upon the direction of rotation of thumb wheel 108.

Figure 5:
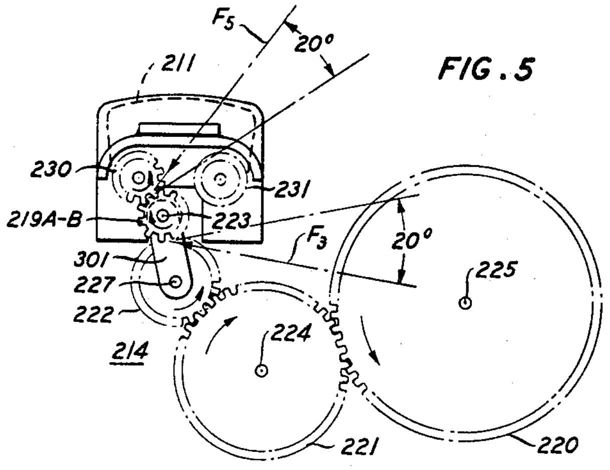
FIG. 5 is a plan view of the gear train assembly.
Figure 6:
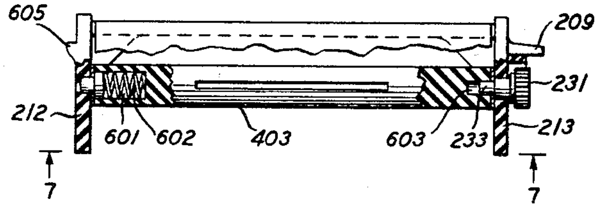
FIG. 6 is a side view of the table assembly.
Figure 7:
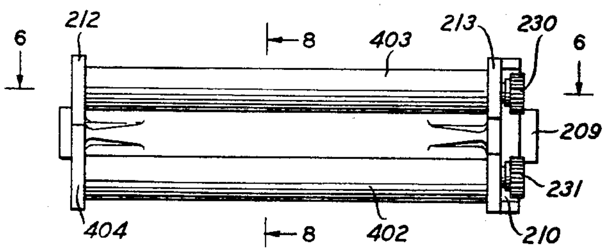
FIG. 7 is a plan view of the table assembly.

In greater detail, the operation of the clutch mechanism and gear train assembly 214 is as follows. When thumb wheel 108 and integral gear 220 are turned in a counterclockwise direction, the other gears in the gear train turn in the directions indicated by the arrows shown in FIG. 5. The upper end of idler arm 301 is mounted on shaft 223 between gears 219A and 219B. Gears 219A and 219B are affixed to shaft 223 and accordingly rotate together, whereas shaft 223 is free to rotate in the bearing surface provided by the accommodating hole in idler arm 301. The entire assembly of idler arm 301, gears 219A and B and shaft 223, pivots about shaft 227 of gear 222. As a result, as shown in FIG. 5, a force F3 and a slip clutch torque $T_C$ are applied to gears 219A–B and idler arm 301, which pivots idler arm 301 in a counterclockwise direction until gear 219A engages gear 230. At that point, gears 219A–B are acted upon by a force F5, indicated by the arrow in FIG. 5, caused by the drag of tape rollers 402 and 403 and tape 211. Forces F3 and F5 both exert a moment on idler arm 301, thus holding gears 219A and 230 engaged. In the parlance of the mechanical gear art such action is commonly termed "gear suck-in." No other external forces are required to hold the gears engaged. If thumb wheel 108 and integral gear 220 are then rotated in the clockwise direction, the forces described above reverse, which results in a throw-out condition for gears 219A and 230, causing them to disengage. Further clockwise rotation causes gears 219A and 231 to engage. Forces similar to, but in directions opposite to, forces F3 and F5 then come into operation and gear 219A is held in mesh with gear 231. With gear 231 being driven, tape 211 is unrolled from roller 403 and rolled on to roller 402.

From the foregoing, it is evident that a back and forth movement of thumb wheel 108 causes gears 219A and B to be flipped back and forth between gears 230 and 231. With only a single one of the gears 230 and 231 being driven at any one time, the selection of that gear being determined by the direction of rotation of thumb wheel 108, the nondriven roller is permitted to rotate independently without interfering with the movement of the tape as the tape is transferred from one roll to the other.

It is to be understood that the embodiment described herein is merely illustrative of the principles of the invention. Modification thereto may be effected by persons skilled in the art without departing from the spirit and scope of the invention.

What is claimed is:

1. A telephone set having a stand with a substantially flat face portion, a pocket-like depression in said face portion of said stand, an integral directory tape cartridge assembly removably housed within said depression, said assembly comprising roller members mounted in a frame member, a tape supportably mounted on said roller members, the exposed portion of said tape being substantially flush with said face portion, a single thumb wheel mounted in said stand, only a portion of the edge of said wheel protruding above the level of said face portion, and means hidden from view by said face portion responsive to the movement of said thumb wheel for positioning said tape.

2. A telephone set having a stand with a substantially flat face portion, an open box-like housing formed in said stand with the open side thereof being flush with said face portion, an integral directory tape cartridge assembly removably mounted within said housing, said assembly including a tape member having spaces thereon for the recording of directory indicia, and means for positioning said tape to bring a preselected one of said indicia to a point permitting visual display thereof, the displayed portion of said tape substantially covering said open side of said housing and being substantially flush with said face portion.

3. A telephone set having a stand with a substantially flat face portion, a first aperture in said face portion, an integral directory tape cartridge assembly removably mounted within said aperture below the plane of said face portion, said assembly including a tape member having spaces thereon for the recording of directory indicia, and means for positioning said tape to bring a preselected one of said indicia to a point permitting visual display thereof through said aperture, the displayed portion of said tape substantially covering said aperture and being substantially flush with said face portion.

4. A telephone set having a stand with a substantially flat face portion, switchhook assembly means mounted on said stand above said face portion, dial assembly means mounted in the lower portion of said face portion, a first aperture in said face portion between said switchhook assembly means and said dial assembly means, an integral directory tape cartridge assembly removably mounted within said aperture below the plane of said face portion, said cartridge assembly including a tape member having spaces thereon for imprinting directory indicia, and means for positioning said tape to bring a preselected one of said indicia to a point permitting visual display thereof through said aperture, the displayed portion of said tape substantally covering said aperture and being substantially flush with said face portion.

5. Apparatus in accordance with claim 4 including a second aperture in said face portion, said positioning means including a thumb wheel rotatably mounted in said second aperture, the plane of said wheel being substantially perpendicular to the plane of said face portion, a relatively small segment of said wheel protruding from said second aperture above the level of said face portion, and means responsive to the rotation of said wheel foı positioning said tape.

6. Apparatus in accordance with claim 5 wherein said tape positioning means includes a pair of spool members each having a driving gear mounted on a respective end thereof, said means responsive to the rotation of said wheel comprising gear means interposed between said wheel and each of said driving gears.

7. A telephone set having a stand with a substantially flat face portion, a tub-like housing accomodation with an open side thereof being flush with said face portion; an integral directory tape cartridge assembly removably mounted within said housing accommodation; the displayed portion of said tape substantially covering said open side; said assembly including a first and a second roller member rotatably supported on a frame member; a manually positionable gear wheel mounted in a plane substantially perpendicular to said face portion with a relatively small segment of said wheel protruding above the level of said face portion; means responsive to the clockwise or counterclockwise rotation of said gear wheel for directly driving either said first or said second roller respectively, whereby the nondriven one of said roller members is permitted to rotate freely solely under the force exerted thereon by said tape.

8. Apparatus in accordance with claim 7 wherein said assembly includes a table member, said displayed portion of said tape being supportably positioned by said table member.

9. Apparatus in accordance with claim 7 wherein said driving means includes first and second gears drivably affixed, respectively, to said first and second roller members, gear means interposed between said gear wheel and said first and second gears, and clutch means responsive to the direction of rotation of said gear wheel for engaging said gear means either with said first or with said second gears.

10. A telephone directory tape cartridge assembly for integral mounting within the base of a telephone set, said assembly comprising, in combination, first and second roller members, a tape for recording directory indicia supportably and adjustably mounted on said roller members, said tape having a displayed portion between said roller members substantially flush with one surface of said base, a manually positionable gear wheel mounted within said base having a relatively small segment thereof protruding above said surface, means responsive to the rotation of said gear wheel for drivably rotating one of said roller members, the other of said roller members being rotated by the force of said tape, the driven one of said roller members being determined by the direction of rotation of said wheel.

References Cited

UNITED STATES PATENTS

| | | | |
|---|---|---|---|
| 2,110,381 | 3/1938 | Lohr | 40—336 |
| 2,434,959 | 1/1948 | Richard | 179—903 |
| 2,546,483 | 3/1951 | Venters | 40—337 |
| 3,202,768 | 8/1965 | Atcheson | 179—100 |

FOREIGN PATENTS

| | | |
|---|---|---|
| 484,032 | 9/1929 | Germany. |

WILLIAM C. COOPER, *Primary Examiner.*

LAURENCE A. WRIGHT, *Assistant Examiner.*